(12) United States Patent
Oleksiak et al.

(10) Patent No.: US 11,036,450 B2
(45) Date of Patent: *Jun. 15, 2021

(54) MOBILE PRINTER APPARATUS AND SYSTEM

(71) Applicants: Gregory Oleksiak, Charleston, SC (US); Anthony Stewart Moore, Charleston, SC (US)

(72) Inventors: Gregory Oleksiak, Charleston, SC (US); Anthony Stewart Moore, Charleston, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/518,856

(22) Filed: Jul. 22, 2019

(65) Prior Publication Data

US 2019/0339917 A1    Nov. 7, 2019

Related U.S. Application Data

(63) Continuation-in-part of application No. 14/615,391, filed on Feb. 5, 2015, now Pat. No. 10,362,454.

(60) Provisional application No. 61/935,936, filed on Feb. 5, 2014.

(51) Int. Cl.
  *G06F 3/12*   (2006.01)
(52) U.S. Cl.
  CPC ......... *G06F 3/1292* (2013.01); *G06F 3/1204* (2013.01); *G06F 3/1243* (2013.01)

(58) Field of Classification Search
  CPC .... G06F 3/1292; G06F 3/1243; G06F 3/1204; G06F 3/1238; G06F 3/1222; G06F 3/1267; G06F 3/1221; Y02D 10/00
  USPC ........................................................ 705/15
  See application file for complete search history.

(56) References Cited

U.S. PATENT DOCUMENTS

| | | | | |
|---|---|---|---|---|
| 7,957,014 | B2 * | 6/2011 | Biundo | H04N 1/00137 358/1.15 |
| 2007/0173266 | A1 * | 7/2007 | Barnes, Jr. | G06Q 20/322 455/456.1 |

* cited by examiner

*Primary Examiner* — Garcia Ade
(74) *Attorney, Agent, or Firm* — Gregory Finch; Finch Paolino, LLC

(57) ABSTRACT

A mobile printer operable to receive orders including restaurant orders via an API from a server communicating through a wireless network including cellular network. According to embodiments of the present disclosure, an API existing on a networked server enables the server to communicate with external clients, store print jobs according to requests by external clients, and respond to status requests. The API may authenticate requests from all clients; receive and store orders; listen to polling requests from the thermal ticket printer; communicate orders to the thermal ticket printer when present; store status of print jobs for clients; monitor the availability of the thermal ticket printer; and serve as a gateway or router for external computing clients to a communications network including the Internet.

20 Claims, 6 Drawing Sheets

MOBILE PRINTER APPARATUS AND SYSTEM

RELATED APPLICATIONS

This application is a continuation-in-part of U.S. patent application Ser. No. 14/615,391 filed Feb. 5, 2015, which claims the benefit of U.S. Provisional Application 61/935,936, filed Feb. 5, 2014, the disclosures of each of which are hereby incorporated by reference herein in their entirety.

FIELD

The present disclosure relates to the field of wireless printer systems, in particular, a printer that communicates to an application programming interface (API) via a cellular network to receive and execute print jobs in the form of data from clients.

BACKGROUND

In today's printing environment, to make a printer's functionality available to a number of different people, the printer is often incorporated into a computing network using various hard line network connections. For example, a printer in a business environment, such as an office, typically has a network port with a cable physically connected to it. The cable typically runs to or accesses a network server. Each person who desires to print on such a printer from their desktop computer typically accesses the printer via a network cable that runs from their computer to a network connection that accesses the network server.

In many industries, output devices such as printers for printing customer orders or receipts are often used with point of sale (POS) or point of purchase (POP) systems. The POS or POP is the time and place for the completion of an order or transaction. In the hospitality or restaurant industry, POS systems are used to communicate food orders from the service staff to the kitchen staff. When a food order is inputted into the POS by the server, the order details are communicated to the ticket printer via a wireless or wireline network connection and printed by the printer.

In the restaurant industry, many restaurants receive orders from customers outside the restaurant for pick-up or delivery. These orders are received by a variety of means, including online orders via the restaurant's website; phone orders made by the customer directly to the restaurant; or third-party services that receive orders from the customer and relay the orders to the restaurant. With respects to third-party services, the method of communicating customer orders requires personnel from the restaurant to receive the orders via phone or e-mail. Outside orders must be manually inputted into the restaurant's POS system, unless the restaurant has a fully integrated POS system, which is cost prohibitive for most small restaurants.

POS or POP systems are designed historically to serve the retail, wholesale, and hospitality industries. However, these systems are currently used in a variety of venues and applications including goods and property leasing businesses, equipment repair shops, healthcare management, fulfillment locations, gas pumps, kiosks, telematics, delivery trucks, ATMs, meters, ticketing offices such as cinemas, concerts, and sports facilities and many other operations where capabilities such as the following are required: processing monetary transactions, allocation and scheduling of facilities, keeping record and scheduling services rendered to customers, tracking of goods and processes (repair or manufacture), invoicing and tracking of debts and outstanding payments, and printing various paper outputs depending the specific needs of the venue location, customers, staff, and services.

What is needed, therefore, is an apparatus and system that enables an establishment to send or receive a printable order to or from a staff member or a customer using a remote communication channel. The system and apparatus enable a hospitality establishment such as a restaurant to receive a food order from a customer via email or text message, and directly print the order in the restaurant without the need for the manual input of information into a POS system. Broadly, the system and apparatus enable a plethora of industry establishments or businesses to send, receive, and directly print a persistent visible representation of graphics or text on a physical media via a wireless remote communication network.

SUMMARY

The following presents a simplified summary of some embodiments of the disclosure in order to provide a basic understanding of the disclosure. This summary is not an extensive overview of the disclosure. It is not intended to identify key/critical elements of the disclosure or to delineate the scope of the disclosure. Its sole purpose is to present some embodiments of the disclosure in a simplified form as a prelude to the more detailed description that is presented later.

Aspects of the present disclosure provide for a mobile printing apparatus comprising a communications interface comprising a cellular communications chipset and a subscriber identity module, the subscriber identity module defining a specified endpoint in an application programming interface executing on a remote application server; a processor being operably engaged with the communications interface; a memory device operably engaged with the processor and being configured to store one or more instructions to be executed by the processor, the one or more instructions comprising instructions for executing a communication protocol to the remote application server via the communications interface; instructions for receiving a fulfillment request from the remote application server via the communications interface; instructions for processing a print job associated with the fulfillment request; and, instructions for communicating a fulfillment confirmation to the remote application server; an input device being operably engaged with the processor, the input device being operable to communicate one or more fulfillment values to the processor corresponding to the fulfillment request; and, a print unit operably coupled to the processor; the print unit being configured to print graphical output associated with the fulfillment request.

Further aspects of the present disclosure provide for a mobile printing apparatus comprising a wireless communications interface being communicably engaged with a communications network, the wireless communications interface defining a specified endpoint in an application programming interface executing on a remote application server; a processor being operably engaged with the wireless communications interface; a memory device operably engaged with the processor and being configured to store one or more instructions to be executed by the processor, the one or more instructions comprising instructions for executing a communication protocol to the remote application server via the wireless communications interface, the communication protocol comprising a heartbeat parameter;

instructions for receiving a fulfillment request from the remote application server via the wireless communications interface; instructions for processing a print job associated with the fulfillment request; and, instructions for communicating a fulfillment confirmation to the remote application server; an input device being operably engaged with the processor, the input device being operable to communicate one or more fulfillment values to the processor corresponding to the fulfillment request; and, a print unit operably coupled to the processor, the print unit being configured to print graphical output associated with the fulfillment request.

Still further aspects of the present disclosure provide for a mobile printing apparatus comprising a wireless communications interface being communicably engaged with a communications network via a wireless Internet connection, the wireless communications interface defining a specified endpoint in an application programming interface executing on a remote application server, the wireless communications interface comprising a Wi-Fi access point for a third-party client device; a processor being operably engaged with the wireless communications interface; a memory device operably engaged with the processor and being configured to store one or more instructions to be executed by the processor, the one or more instructions comprising instructions for executing a communication protocol to the remote application server via the wireless communications interface, the communication protocol comprising a heartbeat parameter; instructions for receiving a fulfillment request from the remote application server via the wireless communications interface; instructions for processing a print job associated with the fulfillment request; and, instructions for communicating a fulfillment confirmation to the remote application server; an input device being operably engaged with the processor, the input device being operable to communicate one or more fulfillment values to the processor corresponding to the fulfillment request; and, a print unit operably coupled to the processor, the print unit being configured to print graphical output associated with the fulfillment request.

An object of the present disclosure is a thermal printer which communicates to an application programming interface (API) via one or more wireless communication means including a cellular network. The API may accept print jobs in the form of data from clients, store it and make it available to the printer. The printer may communicate the status of the print job to the API, which in turn may communicate a status to external clients.

An object of the present disclosure is a printer, including but not limited to, thermal, dot matrix, laser, inkjet, LED, multi-function, or the like, which communicates to an application programming interface (API) via one or more wireless communication means including a cellular network. The API may accept print commands in the form of data from clients, store it and make it available to the printer. The printer may communicate the status of the print commands to the API, which in turn may communicate a status to external clients.

An object of the present disclosure is a system comprising a printing device configured to print a restaurant order ticket; at least one processor associated with the printing device; at least one communications interface operably engaged with the at least one processor, the at least one communications interface operable to receive a restaurant order; one or more computer-readable media operably engaged with the at least one processor; computer-readable instructions stored on the one or more computer-readable media that, when executed by the at least one processor, cause the at least one communications interface to make an order request to a cellular network, and instruct the printing device to print a restaurant order ticket; a cellular phone configured to communicate a text message containing restaurant order over a cellular network; a server communicably connected to a cellular network, the server operable to receive and store the restaurant order from the cellular phone, and communicate the restaurant order to the printing device in response to the order request.

Another object of the present disclosure is a system comprising a printing device or apparatus configured to print one or more persistent visible representation of graphics or text on a physical media, including but not limited to an order, ticket, coupon, voucher, receipt, bill, advertisement, printout, sticker, stamp, label, address label, barcode, badge, picture; at least one processor (e.g., microprocessor, microcontroller, etc.) associated with the printing device; at least one wireless communication technology (e.g., RF, Wi-Fi, Bluetooth, LTE, cellular transceivers) operably engaged with the at least one processor, the at least one wireless communication technology operable to send or receive one or more instructions including but not limited to an order; one or more computer-readable storage media operably engaged with the at least one processor; computer-readable instructions stored on the one or more computer-readable storage media that, when executed by the at least one processor, cause the at least one wireless communication technology to send or receive one or more data stream containing at least one printer instructions, commands, or contents via a remote wireless communication network including a cellular network, and instruct the printing device to produce an output of one or more persistent visible representation of graphics or text on a physical media; a cellular or mobile phone configured to communicate a text message containing printing instructions and contents for producing one or more persistent visible representation of graphics or text over a cellular network; a server communicably connected to a wireless communication network including but not limited to, a cellular network or the Internet, the server operable to receive and store one or more instruction, command, order, or requests from the cellular or mobile phone, and communicate the information to the printing device in response to the instruction, command, order, or request. In various embodiments, the said physical media includes but is not limited to paper, bond paper, coated paper, adhesive paper, or the like.

Still another object of the present disclosure is a restaurant ticket printer comprising a communications interface; a computer-readable medium storing instructions for operating the restaurant ticket printer including communicating with a server through the communications interface to receive, format and print restaurant orders received from the server via the communications interface; a processor for executing instructions stored on the computer-readable medium; an input device configured to input a wait-time value; and, a print unit operably coupled to the processor.

Still another object of the present disclosure is a printer configured to print one or more persistent visible representation of graphics or text on a physical media comprising: a processor; computer-readable memory storage medium; a communications interface; a user interface input-output (I/O) device; a scanner (e.g., barcodes/QR codes); and, a print unit operably coupled to the processor. In various embodiments, the computer-readable memory storage medium comprises one or more firmware, middleware, or software pertaining to printer processor instructions, device operation, communication protocols, service protocols, and application protocols. In various embodiments, the one or more firmware, middleware, or software enable the printer to pair and wirelessly communicate with one or more external clients, provide access of said printer to external devices connected to one or more said communications network, function as a gateway/hub to local, wide, intranet, Internet, or cellular communication network, enable customer/mobile client access to a POS or POP system, via the communications interface. In various embodiments, the said printer can receive one or more print requests or orders from more than one mobile or desktop client through a multi-tenant architecture. In various embodiments, said user I/O interface device is configured with one or more preset or adjustable functions, including but not limited to, a wait-time value, an order fulfillment time per order, adjustable alert (e.g., audio volume, screen intensity, etc.), "out-of-paper" alert, or the like. In various embodiment, the printer is configured to enable one or more functions or features, including but not limited to, double-printing, print-on-demand, or print full size paper. In various embodiments, the said scanner enables the identification of a user (e.g., customer, staff, etc.) for authentication, validation, verification purposes by a third-party observer or system administrator. In various embodiments, the printer provides automatic, redundant connectivity from a local area network (e.g., Wi-Fi) to a cellular network backup server for high Quality of Service (QoS).

Yet another object of the present disclosure is a restaurant ticket system comprising a server operably connected to a communications network, the server operable to execute an API that enables the server to receive and transmit restaurant orders via the communications network; a printing device having a communications interface communicably engaged with the server via the communications network; a computer-readable medium associated with the printing device, the computer-readable medium storing instructions for operating the printing device including communicating with the server through the communications interface to receive, format and print restaurant orders received from the server via the communications interface; a processor associated with the printing device for executing instructions stored on the computer-readable medium; an input device associated with the printing device configured to input a wait-time value; and, a print unit associated with the printing device operably coupled to the processor; a client device operable to communicate a restaurant order to the server via the communications network.

Yet another object of the present disclosure is a persistent visible representation of graphics or text printing system comprising a server operably connected to a communications network, the server operable to execute an API that enables the server to receive and transmit one or more requests or orders via the communications network; a printing device having a communications interface communicably engaged with the server via the communications network; a computer-readable medium associated with the printing device, the computer-readable medium storing instructions for operating the printing device including communicating with the server through the communications interface to receive, format and print one or more persistent visible representation of graphics or text received from the server via the communications interface; a processor associated with the printing device for executing instructions stored on the computer-readable medium; an input device associated with the printing device configured to one or more said preset inputs; and, a print unit associated with the printing device operably coupled to the processor; a client device operable to communicate a request or order to the server via the communications network.

Yet another object of the present disclosure is a mobile printer management system comprising at least one non-limiting; said printer, said printer as a gateway/router, firmware, middleware, software, API, communication network, cloud server, database, client device (e.g., mobile, desktop, etc.), client portal, and one or more applications residing on a cloud backend server. In various embodiments, application cloud server comprises one or more software application (herein "App") operating to send, receive at least one data, instructions, protocol, message, text message, SMS, event, or command for execution, email, processing, analysis, prediction, broadcast, or communication relating to status, function, or operation of said mobile printer.

The foregoing has outlined rather broadly the more pertinent and important features of the present disclosure so that the detailed description of the disclosure that follows may be better understood and so that the present contribution to the art can be more fully appreciated. Additional features of the disclosure will be described hereinafter which form the subject of the claims of the disclosure. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the disclosure as set forth in the appended claims. Further embodiments, features, and advantages of the disclosure, as well as the structure and operation of the various embodiments of the disclosure are described in detail below with reference to the accompanying drawings.

BRIEF DESCRIPTION OF DRAWINGS

Referring to the figures, wherein like numerals represent like parts throughout the several views.

DETAILED DESCRIPTION

Reference will now be made in detail to various embodiments of the present disclosure, examples of which are illustrated in the accompanying drawings. While the disclosure will be described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following description of various embodiments of the present disclosure, numerous specific details are set forth in order to provide a thorough understanding of the present disclosure. In other instances, well-known methods, procedures, protocols, services, components, and circuits have not been described in detail so as not to unnecessarily obscure aspects of the present disclosure.

Figure 1:
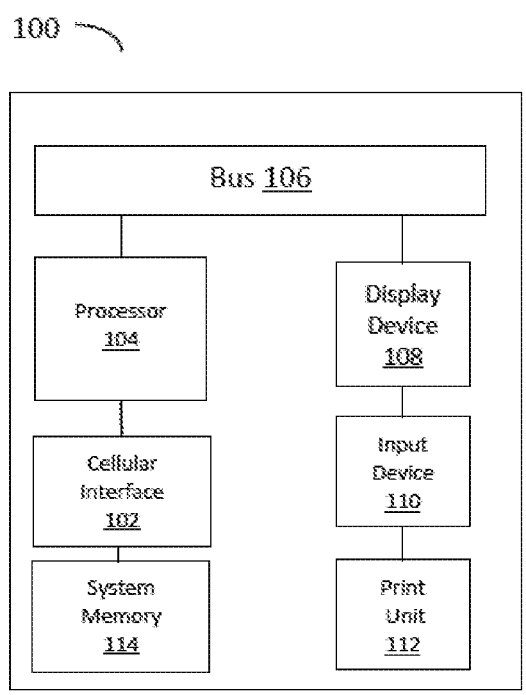
FIG. 1 is a block diagram of a typical computer system into which one implementation of the present disclosure may be incorporated.

According to an embodiment of the present disclosure, FIG. 1 is a functional block diagram generally illustrating a printing device 100, one or more of which may be adapted for use in the illustrative system for implementing the disclosure. The printing device may be, for example, a printer system networked with a personal computer, a handheld device such as a cell phone or tablet computer, multi-processor systems, microprocessor-based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

In a preferred embodiment, printing device 100 is generally comprised of cellular interface 102, a processor 104, a system bus 106, at least one display device 108, at least one input device 110, a printer unit 112, and system memory 114. Cellular interface 102 can be any off-the-shelf hardware operable to communicate messages via a cellular network. This can include 2G, 3G, 4G, and 5G chips that enable communication via a wireless Internet network or cellular network. Cellular interface 102 may be replaced by wireless Internet interface; wireless internet interface may be in addition to a cellular interface. In an alternative embodiment, cellular interface 102 may be replaced by one or more wireless technologies for local or wide area network communication, including but not limited to, WI-FI, Bluetooth, BLE, RFID, NFC, UWB, IEEE 802.15.4, Z-Wave, or the like. Depending on the configuration and type of printing device 100, system memory 114 may be volatile (such as RAM), non-volatile (such as ROM, flash memory, etc.), or some combination of the two. System memory 114 should be a computer-readable medium capable of storing instructions for operating the printer including communicating with an API through cellular interface 102 to receive, format, and print resources received directly from the API via cellular interface 102. In an alternative embodiment, system memory 114 should be a computer-readable medium capable of storing instructions for operating the printer including communicating with an API through using one or more said wireless technologies to receive, format, and print resources received directly from the API. Processor 104 processes or executes various instructions necessary to operate printing device 100 and communicate with a cellular network, local area, or wide area network. System bus 106 can communicate instructions from processor 104 to display device 108, input device 110, and a print unit 112. Display device 108 can be an LCD screen that enables a user to see messages such as pending orders, system status and system settings. In an embodiment, input device 110 is a knob, or knobs, that enable a user to select "Pickup Time" and "Delivery Time" values into printing device 100. In an alternative embodiment, input device 110 enables a user to adjust one or more audible alerts or visual cues, including but not limited to, audio volume, display intensity (e.g., lumens) outputs of display device 108. Input device 110 can also include a print button. The print button communicates a print request to the processor 104 via system bus 106, and the printed circuit board 104 in turn communicates any pending print jobs to printer device 100. In an embodiment, print unit 112 is a thermal printer. A thermal printer is a device for thermal printing. Thermal printing (or direct thermal printing) is a digital printing process which produces a printed image by selectively heating coated thermochromic paper, or thermal paper, when the paper passes over the thermal print head. The coating turns black in the areas where it is heated, producing an image. Printer 100 may also include a subscriber identity module, or SIM card, for unique identification of each printer in a distributed network such that an API executing over a networked server may correctly communicate intended messages to each printer device 100. In various embodiments, print unit 112 is a dot matrix, laser, inkjet, LED, or multi-function printer.

Figure 1B:
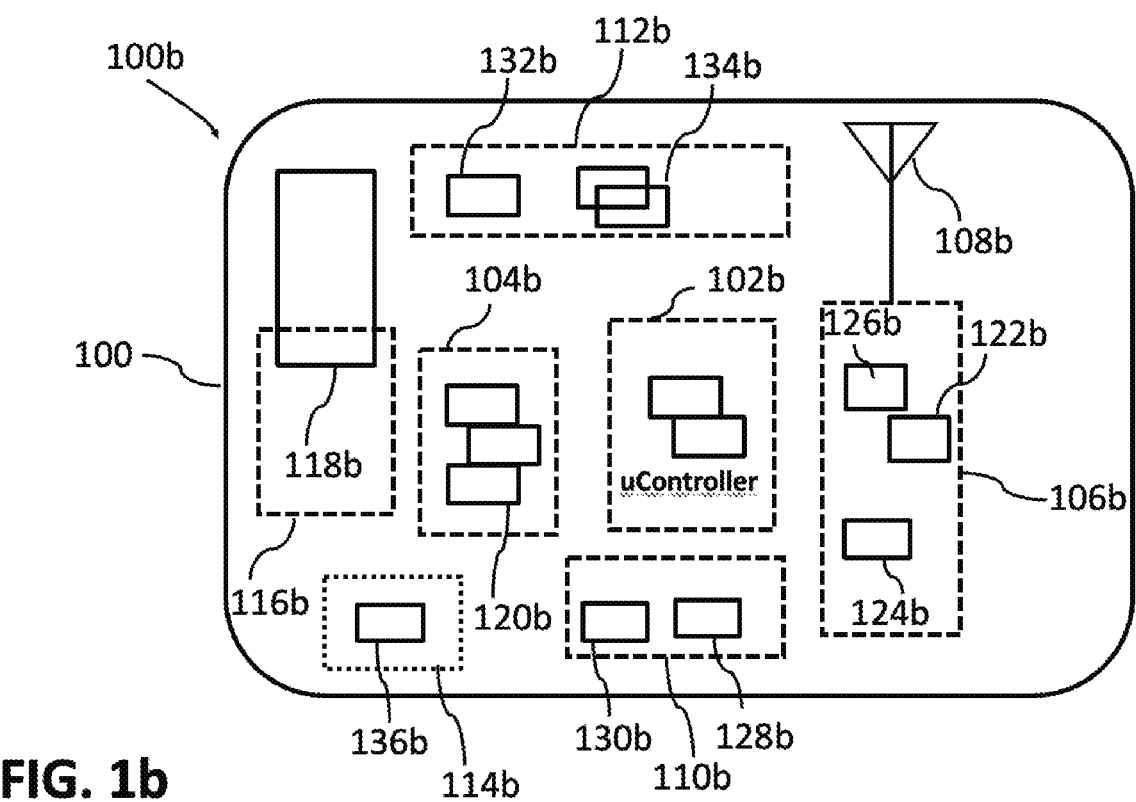
FIG. 1b is a block diagram of a printing device into which one implementation of the present disclosure may be incorporated.

Referring now to FIG. 1b, a block diagram 100b of printing device is shown, according to various embodiments. Printing device 100 of FIG. 1 comprises one or more, including but not limited to; processor module 102b, memory storage module 104b, wireless communication technology module 106b, antenna 108b, power module 110b, input-output (I/O) module 112b, scanner module 114b, motor module 116b, and a print module 118b. In various embodiments, the processor module 102b comprises at least one microcontroller, a microprocessor, a CPU, the like, or combinations thereof. In one embodiment, one or more microprocessor comprises an embedded real-time operating system, tuned and deeply optimized for low power consumption. In various embodiments, the memory storage module 104b comprises at least one transitory or non-transitory memory storage device 120b (e.g., Flash, RAM, ROM, EPROM, etc.). In various embodiments, the wireless communication module 106b comprises at least one transceiver 122b, configured to operate as a transmitter-receiver, using one or more communication means, technology, network, protocol, or standard, including but not limited to, WI-FI, Bluetooth, BLE, RFID, NFC, UWB, IEEE 802.15.4, Z-Wave, RF, UHF, LC, LAN, WAN, GPS, cellular, the like, or combinations thereof. In a preferred embodiment, communication module 106b comprises a WI-FI transceiver 124b and a Bluetooth transceiver 126b. In various embodiments, the antenna module comprises one or more antenna 108b. In various embodiments, the power module 110b comprises at least one battery 128b, optionally rechargeable. In an alternative embodiment, the power module comprises optionally at least one direct connection 130b to an external power source. In various embodiments, I/O module 112b comprises: one or more input device 132b, including but not limited to button, knob, keypad, keyboard, microphone; and one or more output device 134b, including but not limited to, audio speaker, display, LCD screen, LED, or combinations thereof. In various embodiments, scanner module 114b comprises one or more scanner, including but not limited to, CCD array, optical, ultrasound, RF, magnetic strip scanner, barcode scanner 136b, IR, magnetic card scanner, ID badge scanner, RFID scanner, the like, or combinations thereof. In a specific embodiment, a delivery driver can scan an ID badge to verify arrival at a location of said printer 100, upon which the printer can send a message to a third-party to notify the presence of the driver. In various embodiments, motor module 116b comprises one or more motor, including but not limited to, cutter motor, printer motor, etc. In various embodiments, print unit 118b comprises one or more mechanism for thermal, a dot matrix, laser, inkjet, LED, or multi-function printing. In various embodiments, print unit 118*b* can be configured to produce one or more print outputs on paper of varying dimensions including A4, Legal, and Letter. In various alternative embodiments, one or more components or combinations of components of said printer 100 can be implemented as one or more embedded system, ASIC, SoC, IC, FPGA, the like, or combinations thereof, interconnected via one or more serial or parallel computer system bus, port, or electrical connections, including but not limited to, UART., USB, RS232, Ethernet, Inter-integrated circuit ($I^2C$), or combinations thereof. In various alternative embodiments, the one or more components of said printer 100 can be implemented using one or more hardware, including but not limited, smartthings, Arduino, Phigets, Intel Galileo, Raspberry Pi, Gadgeteer, BeagleBone, Cubieboard, the like, or combinations thereof. In other embodiments, firmware may be incorporated to simplify one or more function of one or more hardware component of the said printer. In various embodiments, processor module 102*b* processes or executes various instructions necessary to operate said printing device 100 and communicate with a cellular network, local area, or wide area network. One or more system bus can communicate instructions from processor module 102*b* to display device 134*b*, input device 132*b*, and a print unit module 118*b*. Display device 134*b* can be an LCD screen that enables a user to see messages such as pending orders, system status and system settings. In an embodiment, input device 132*b* is a knob, or knobs, that enable a user to select "Pickup Time" and "Delivery Time" values into said printing device 100. In an alternative embodiment, input device 132*b* enables a user to adjust one or more audible alerts or visual cues, including but not limited to, audio volume, display intensity (e.g., lumens) outputs of display device 134*b*. Input device 132*b* can also include a print button. The print button communicates a print request to processor 102*b* via a system bus, and the processor module 102*b* in turn communicates any pending print jobs to said printer device 100. In an embodiment, print unit 118*b* is a thermal printer. In an alternative embodiment, print unit 118*b* is a dot matrix, laser, inkjet, LED, or multifunction printer. In various embodiments, said printer 100 can provide automatic, redundant connectivity from a local area network (e.g., Wi-Fi) to a cellular network backup server for high Quality of Service (QoS). In various embodiments, printer device 100 can serve as a printer for one or more external computing devices in the vicinity, via a local, wide, or cellular network.

Figure 2:
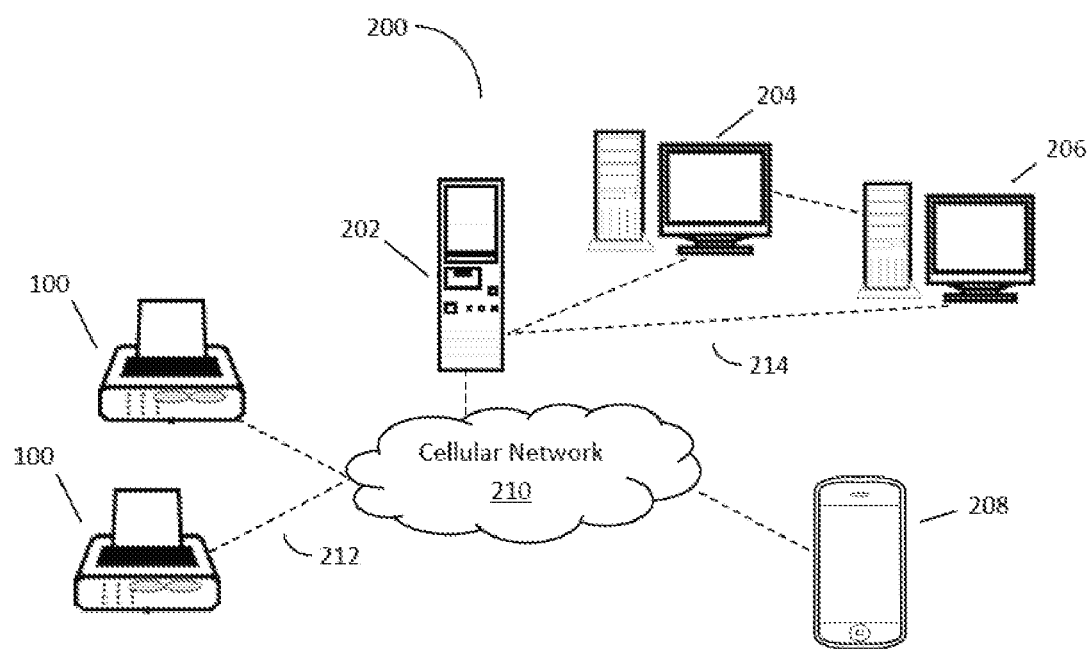
FIG. 2 is a block diagram of a typical system into which one implementation of the present disclosure may be incorporated.

According to an embodiment of the present disclosure, FIG. 2 is a block diagram of a typical system into which one implementation of the present disclosure may be incorporated. In an exemplary embodiment, system 200 enables electronic transmission of a restaurant order from a client machine 204 to an application programming interface (API) executing on a networked server 202 that transmits the order over a dedicated cellular connection to a printing device 100, which confirms receipt of the order. The API defines the specifications for routines, data structures, object classes, and variables to enable networked server 202 to receive orders from an external client and communicate instructions to the appropriate printing device 100. In an embodiment, the API 202 receives and stores orders from external clients. External clients can include a customer machine 204, a third-party machine 206, and/or a cell phone 208.

In an exemplary embodiment, printing device 100 is located in a restaurant. Customer machine 204 is associated with a restaurant customer placing an order to the restaurant via a Web application. The order is communicated through an internet connection 214 to server 202 and communicated to printing device 100 through cellular network 210. A restaurant customer may also place an order to a restaurant indirectly via a third-party machine 206. In this scenario, the customer may place an order via a third-party Web application that communicates the order to third-party machine 206 via Internet connection 210. Third-party machine 206 communicates the order to printing machine 100 in the same manner as customer machine 204 described above. An order may also be communicated to printing machine 100 via cell phone 208. A user may text message an order to server 202 via cellular network 210. Server 202 then communicates the order to printing machine 100 via cellular network 210.

According to an alternative embodiment of the present disclosure, FIG. 2 is a block diagram of a system into which another implementation of the present disclosure may be incorporated. In an exemplary embodiment, system 200 enables electronic transmission of a print instruction, command, or order generated as a persistent visible representation of graphics or text on a physical media from a client machine 204 to an application programming interface (API) executing on a networked server 202 that transmits the order over a dedicated cellular connection to a printing device 100 of FIG. 1, which confirms receipt of the instruction, command, or order. In various embodiments, the persistent visible representation of graphics or text on a physical media includes but is not limited to; an order, ticket, coupon, voucher, receipt, bill, advertisement, printout, sticker, stamp, label, meter information, address label, barcode, badge, picture, or output containing one or more graphics or texts. The API defines the specifications for routines, data structures, object classes, and variables to enable networked server 202 to receive orders from an external client and communicate instructions to the appropriate printing device 100 of FIG. 1. In an embodiment, the API 202 receives and stores orders from external clients. External clients can include a customer machine 204, a third-party machine 206, and/or a cell phone 208. In various embodiments, a user may use a cell phone 208 to send an order, for a non-limiting example, a customer ordering food at a restaurant table, or remotely, or a customer purchasing a product at a store shelf to be fulfilled by a warehouse staff. In these examples, wireless local or wide area communication technologies (e.g., WI-FI, Bluetooth, BLE, etc.) may be employed to facilitate communication between cell phone 208 and printing device 100. One or more communications from printing device 101 of FIG. 2 may be sent and received by cell phone 208, including but not limited to; receipt, bill, coupons, advertisements, loyalty program information, one or more host content (e.g., greetings, welcome page, etc.).

In an exemplary embodiment, printing device 100 of FIG. 1 or FIG. 2 is located in a warehouse or back-office. Customer machine 204 is associated with a customer placing a purchase order of a product to a retail, wholesale, or ecommerce business or entity via a Web application. The order is communicated through an Internet connection 214 to server 202 and communicated to said printing device 100 through cellular network 210. A customer may also place an order to said business or entity indirectly via a third-party machine 206. In this scenario, the customer may place an order via a third-party Web application that communicates the order to third-party machine 206 via Internet connection 210. Third-party machine 206 communicates the order to printing machine 100 in the same manner as customer machine 204 described above. An order may also be communicated to said printing machine 100 via cell phone 208. A user may send a text message of a purchase order to server 202 via cellular network 210. Server 202 then communicates the order to said printing device 100 via cellular network 210.

In another exemplary embodiment, printing device 100 of FIG. 1 or FIG. 2 is connected to one or more POS or POP system. The POS or POP are employed in one or more venues and or applications, including but not limited to: goods and property leasing business equipment repair shop; healthcare management; hospital; physician office; dental office; hospitality location; hotel lobby; hotel room; fulfillment location, warehouse; gas station; gas pump; electric vehicle charging station; train station; kiosk, vehicle dashboard, car; bike; bus; truck; van; ATM; meter, ticketing offices such as cinemas, concerts, and sports facilities and many other operations where capabilities such as the following are required: processing monetary transactions, allocation and scheduling of facilities, keeping record and scheduling services rendered to customers, tracking of goods and processes (repair or manufacture), invoicing and tracking of debts and outstanding payments, and printing various paper outputs depending the specific needs of the venue location, customers, staff, and services. Desktop client machine 204 is associated with a client user placing a purchase order of a product to a retail, wholesale, or ecommerce business or entity via a Web application. The order is communicated through an Internet connection 214 to server 202 and communicated to said printing device 100 through cellular network 210. A client user may also place an order to said business or entity indirectly via a third-party machine 206. In this scenario, the client user may place an order via a third-party Web application that communicates the order to third-party machine 206 via Internet connection 210. Third-party machine 206 communicates the order to said printing machine 100 in the same manner as client machine 204 described above. An order may also be communicated to said printing machine 100 via cell phone 208. A user may send a text message of an order to server 202 via cellular network 210. Server 202 then communicates the order to said printing device 100 via cellular network 210.

Figure 3:
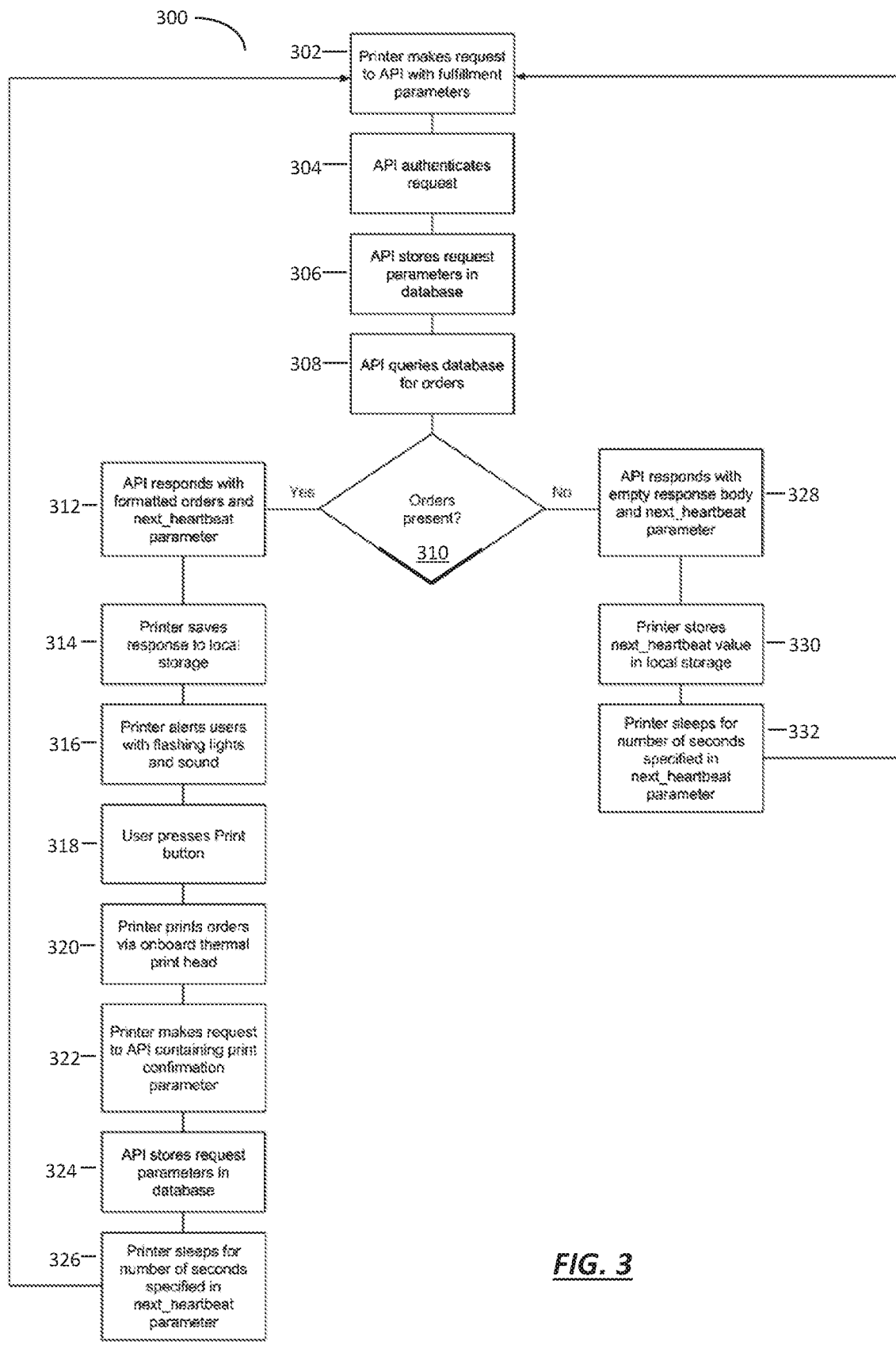
FIG. 3 is a schematic block diagram showing the logic flow of a system for receiving and printing sales transactions.

According to an embodiment of the present disclosure, FIG. 3 is a schematic block diagram showing the logic flow of a system for receiving and printing sales transactions. In an embodiment, an online order taker electronically transmits an order to a server executing an API that transmits the order over a dedicated cellular connection to a ticket printer which confirms receipt of the order. The API receives and stores orders from external clients. The orders are categorized for delivery to the correct printer. The API presents orders to the corresponding printer when requested. The API receives status updates from the printer related to print job status. The printer polls the API on regular intervals, requesting orders. If the API has an order queued for delivery to that printer, it is presented as a response to the printer's poll request. The system software or API is operable to authenticate requests from all clients; receive orders from external clients; store the order; listen for polling requests from printers; present printers with orders when present; store status of print jobs for clients; and, monitor the availability of printers. In alternative embodiments, other printing transactions include but are not limited to the said venues, locations, or applications requiring the generation of a persistent visible representation of graphics or text on a physical media (e.g. paper).

According to a system 300, a printer makes a request to an API with fulfillment parameters 302. The request may be communicated through a cellular network to the API executing on a networked server, as described in FIG. 2. The API may authenticate the request 304 and store the request parameters in a database 306. According to predetermined intervals, the API queries the database for orders 308 to determine if orders are present 310. If orders are not present, the API responds with empty response body and "next-_heartbeat" parameter 328. A "heartbeat" parameter is a predetermined interval upon which the printer communicates an inquiry to the API. The printer stores the heartbeat value in local storage 330 and remains dormant for the time specified in the heartbeat parameter 332 before making another request to the API with fulfillment parameters 302.

If orders are present in the orders database 310, the API responds to the printer with formatted orders and a next-_heartbeat parameter 312. The printer then saves the response to local storage 314 and alerts users with flashing lights and/or sound(s) 316. A user then presses or selects a "print" button or prompts on the printer 318, and the printer prints orders via an onboard thermal print head 320. The printer then makes a request to the API containing the print confirmation parameter(s) 322 and stores the request parameter(s) in the database 324. The API may communicate a confirmation message to an external client. Upon completion of a print job, the printer "sleeps" for a period of time specified in the heartbeat parameter 326 before making another request to the API with fulfillment parameters 302.

Figure 4:
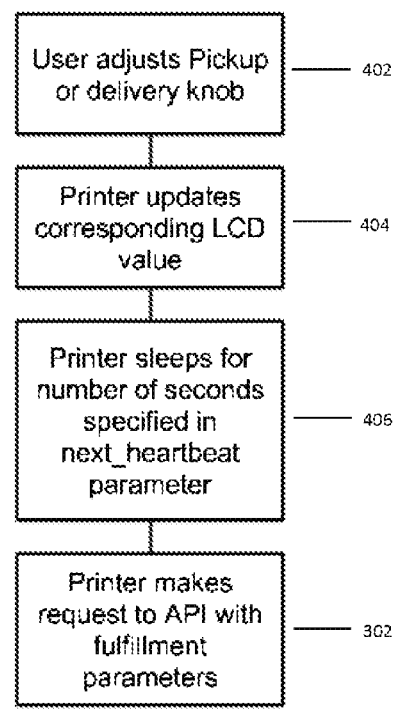
FIG. 4 is a schematic block diagram of a routine executed during the logic flow of a system for receiving and printing sales transactions; and, FIG. 5 is a schematic of a printer gateway architecture into which one implementation of the present disclosure may be incorporated.

According to an embodiment of the present disclosure, FIG. 4 is a schematic block diagram of a routine executed during the logic flow of a system for receiving and printing sales transactions. In an embodiment, the printer can communicate estimated pick-up and delivery wait-times to an API executing on a networked server, which can then communicate the wait time value to an external client. A user can adjust a pick-up or delivery input knob 402 to correspond with a desired wait-time value on the printer device. The printer can update wait-time value(s) in system memory and display values on a display device 404, such as an LCD screen. The printer may then sleep for a predetermined number of seconds according to the heartbeat parameter 406 before making a request to the API with fulfillment parameter 302. In additional embodiments, the delivery input knob 402 can be configured to set function of said printer with other features, including but not limited to, double-print, order fulfillment time adjustments, print on demand, re-print, or the like. In alternative embodiments, other printing transactions include but not limited the said venues, locations, or applications requiring the generation of a persistent visible representation of graphics or text on a physical media (e.g., paper).

Figure 5:
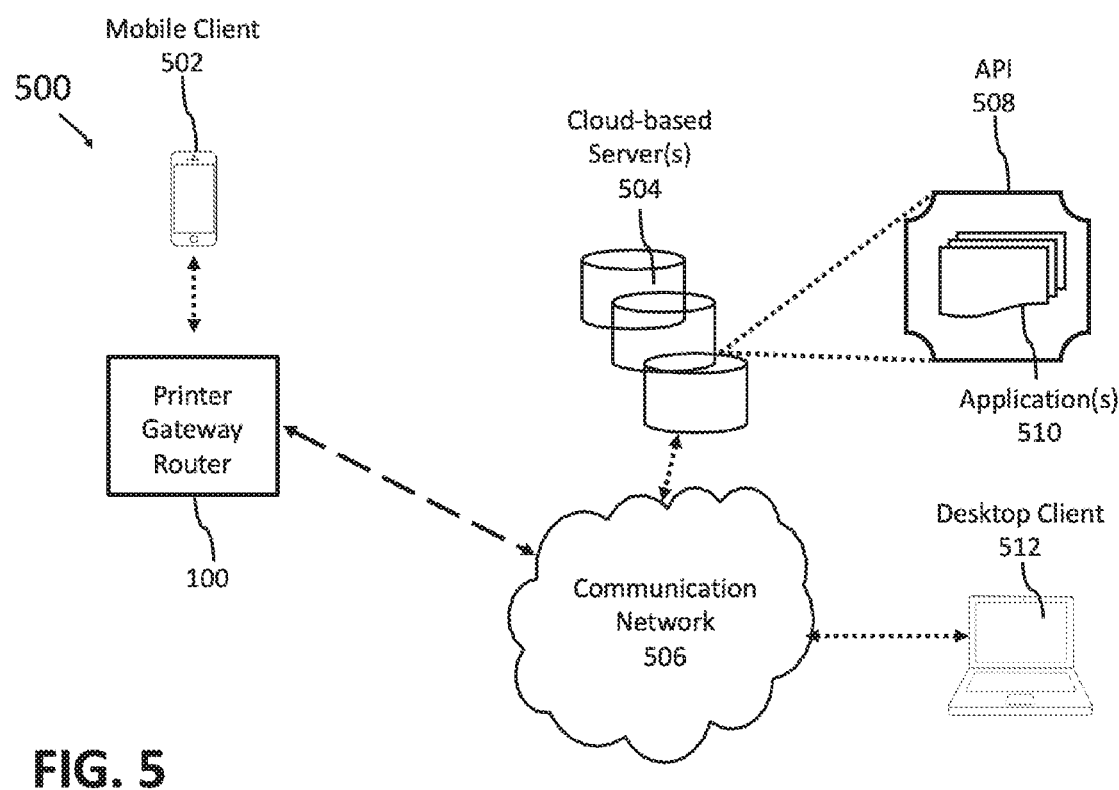

Referring to FIG. 5, a schematic 500 of a printer gateway architecture is shown, according to various embodiments. The architecture comprises a printer 100 of FIG. 2 configured as a gateway or wireless router to facilitate communication for one or more computing client 502 to communicate with one or more cloud server 504, equivalent to server 202 of FIG. 2 via a communication network 506. Computing client 502 can be a mobile computing device, a desktop computing device, a kiosk, a tablet, a smart phone, or the like. In various embodiments, communication network 506 comprises, but is not limited to, one or more; LAN, WAN, wireless network, cellular network, Internet, the like, or combinations thereof. In various embodiments, cloud server 504 comprises an Internet of Things (IoT) platform with various applications for ingestion or processing of data generated by said printer 100 and one or more computing client 502. In one implementation, computing client 108 communicates with cloud server 504 via printer gateway/router phone 100. The said cloud server and services are commonly referred to as "cloud computing", "on-demand computing", "software as a service (SaaS)", "platform computing", "network-accessible platform", "cloud services", "data centers," and the like. The term "cloud" can include a collection of hardware and software that forms a shared pool of configurable computing resources (e.g., networks, servers, storage, applications, services, etc.), which can be suitably provisioned to provide on-demand self-service, network access, resource pooling, elasticity and measured service, among other features. In various embodiments, cloud-based server 504 comprises one or one or more software application (API) 508 to enable the development of one or more software application product 510 providing one or more functions, including but not limited to, data processing, data analysis, data presentation in graphical form, data annotation, or the like. In various embodiments, the application product 510 comprises a system and methods for collecting, processing, and synthesizing insights from at least one computing client or gateway. In various embodiments, a user (e.g., third-party observer) may access the insights from a desktop client 512. Similarly, a worker may access instructions or guidance using computing client 502, or vice versa. In one implementation, computing client 502 is a mobile phone comprising one or mobile app capable of communicating with cloud-server 504 to access said information. Similarly, desktop client 512 can access cloud-based server 504 via communication network 506. In various embodiments, a client device (e.g., mobile phone, mobile computing device, PC, etc.) is communicably engaged with the application cloud server, the client device product app(s) comprises one or more graphical user interface (GUI) being operable to run one or more current instance, historical instance, prediction, recommendation, or combinations thereof, relating to the status, function, or operation of printer 100 or computing client 502. In various embodiments, said cloud server and various applications provide access for at least one external CRM system.

Although the present disclosure has been described with several embodiments, numerous changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A mobile printing apparatus comprising:
   a communications interface comprising a cellular communications chipset and a subscriber identity module, the subscriber identity module comprising a specified endpoint in an application programming interface executing on a remote application server;
   a processor operably engaged with the communications interface;
   a memory device operably engaged with the processor and comprising a non-transitory computer readable medium having stored thereon one or more instructions that, when executed, cause the processor to perform one or more operations, the one or more operations comprising:
   executing a communication protocol to the remote application server via the communications interface;
   receiving a fulfillment request from the remote application server via the communications interface;
   storing the fulfillment request on the non-transitory computer readable medium of the memory device;
   processing a print job associated with the fulfillment request; and
   communicating a fulfillment confirmation to the remote application server;
   an input/output device comprising at least one user input button and at least one visual output means operably engaged with the processor, wherein the input/output device is configured to communicate one or more input signals to the processor via the at least one user input button; and
   a print unit operably coupled to the processor, the print unit configured to print a graphical output associated with the fulfillment request,
   wherein, upon receiving the fulfillment request from the remote application server, the processor is configured to send control signals to the input/output device to cause the input/output device to generate a visual output comprising a notification of the fulfillment request,
   wherein the processor is configured to send control signals to the print unit to print the print job associated with the fulfillment request in response to receiving an input signal from the at least one user input button comprising a print command,
   wherein, upon processing the print job, the processor is configured to communicate the fulfillment confirmation and one or more fulfillment values associated with the fulfillment request to the remote application server.

2. The mobile printing apparatus of claim 1 wherein the communication protocol comprises a specified heartbeat parameter.

3. The mobile printing apparatus of claim 1 wherein the one or more operations further comprise receiving a fulfillment request from two or more third-party applications.

4. The mobile printing apparatus of claim 1 wherein the input/output device further comprises an optical scanner.

5. The mobile printing apparatus of claim 4 wherein the one or more operations further comprise receiving an optical scan input and associating the optical scan input with the fulfillment request.

6. The mobile printing apparatus of claim 1 wherein the communications interface further comprises a Wi-Fi chipset.

7. The mobile printing apparatus of claim 6 wherein the Wi-Fi chipset is configured as a redundant communications interface to the cellular communications chipset.

8. The mobile printing apparatus of claim 1 wherein the one or more operations further comprise communicating the one or more input signals to the remote application server.

9. A mobile printing apparatus comprising:
   a wireless communications interface being communicably engaged with a communications network, the wireless communications interface comprising a specified endpoint in an application programming interface executing on a remote application server;
   a processor operably engaged with the wireless communications interface;
   a memory device operably engaged with the processor and comprising a non-transitory computer readable medium having stored thereon one or more instructions that, when executed, cause the processor to perform one or more operations, the one or more instructions operations comprising:
   executing a communication protocol to the remote application server via the wireless communications interface, the communication protocol comprising a heartbeat parameter;
   receiving a fulfillment request from the remote application server via the wireless communications interface;

storing the fulfillment request on the non-transitory computer readable medium of the memory device;
processing a print job associated with the fulfillment request; and
communicating a fulfillment confirmation to the remote application server;
an input/output device comprising at least one user input button and at least one visual output means operably engaged with the processor, wherein the input/output device is configured to communicate one or more input signals to the processor via the at least one user input button; and
a print unit operably coupled to the processor, the print unit configured to print a graphical output associated with the fulfillment request,
wherein, upon receiving the fulfillment request from the remote application server, the processor is configured to send control signals to the input/output device to cause the input/output device to generate a visual output comprising a notification of the fulfillment request,
wherein the processor is configured to send control signals to the print unit to print the print job associated with the fulfillment request in response to receiving an input signal from the at least one user input button comprising a print command,
wherein, upon processing the print job, the processor is configured to communicate a fulfillment confirmation and one or more fulfillment values associated with the fulfillment request to the remote application server.

10. The mobile printing apparatus of claim 9 wherein the wireless communications interface comprises a Wi-Fi chipset or a cellular communications chipset.

11. The mobile printing apparatus of claim 9 wherein the wireless communications interface comprises a Wi-Fi chipset and a cellular communications chipset.

12. The mobile printing apparatus of claim 9 wherein the one or more operations further comprise receiving a fulfillment request from two or more third-party applications.

13. The mobile printing apparatus of claim 11 wherein the Wi-Fi chipset is configured as a redundant communications interface to the cellular communications chipset.

14. The mobile printing apparatus of claim 9 wherein the one or more operations further comprise receiving a print job from a third-party client device.

15. A mobile printing apparatus comprising:
a wireless communications interface being communicably engaged with a communications network via a wireless Internet connection, the wireless communications interface comprising a specified endpoint in an application programming interface executing on a remote application server and a Wi-Fi access point for a third-party client device;
a processor operably engaged with the wireless communications interface;
a memory device operably engaged with the processor and comprising a non-transitory computer readable medium having stored thereon one or more instructions that, when executed, cause the processor to perform one or more operations, the one or more operations comprising:
executing a communication protocol to the remote application server via the wireless communications interface, the communication protocol comprising a heartbeat parameter;
receiving a fulfillment request from the remote application server via the wireless communications interface;
storing the fulfillment request on the non-transitory computer readable medium of the memory device;
processing a print job associated with the fulfillment request; and
communicating a fulfillment confirmation to the remote application server;
an input/output device comprising at least one user input button and at least one visual output means operably engaged with the processor, wherein the input/output device is configured to communicate one or more input signals to the processor via the at least one user input button; and
a print unit operably coupled to the processor, the print unit configured to print a graphical output associated with the fulfillment request,
wherein, upon receiving the fulfillment request from the remote application server, the processor is configured to send control signals to the input/output device to cause the input/output device to generate a visual output comprising a notification of the fulfillment request,
wherein the processor is configured to send control signals to the print unit to print the print job associated with the fulfillment request in response to receiving an input signal from the at least one user input button comprising a print command,
wherein, upon processing the print job, the processor is configured to communicate a fulfillment confirmation and one or more fulfillment values associated with the fulfillment request to the remote application server.

16. The mobile printing apparatus of claim 15 wherein the one or more operations further comprise receiving and processing a print job from the third-party client device.

17. The mobile printing apparatus of claim 15 wherein the one or more operations further comprise providing a network interface between two or more connected electronic devices.

18. The mobile printing apparatus of claim 15 wherein the one or more operations further comprise providing static or dynamic content to the third-party client device.

19. The mobile printing apparatus of claim 18 wherein the static or dynamic content is selected from the group consisting of transaction receipts, bills, coupons, advertisements, loyalty program information, and hosted content.

20. The mobile printing apparatus of claim 18 wherein the one or more operations further comprise receiving and processing a user-generated input associated with the static or dynamic content.

* * * * *